Oct. 18, 1927. 1,646,017
A. ECKSTEIN
DEVICE FOR PREVENTING BOILING OVER OF MILK AND FOR INDICATING
THE BOILING OF THE MILK
Filed April 1, 1927
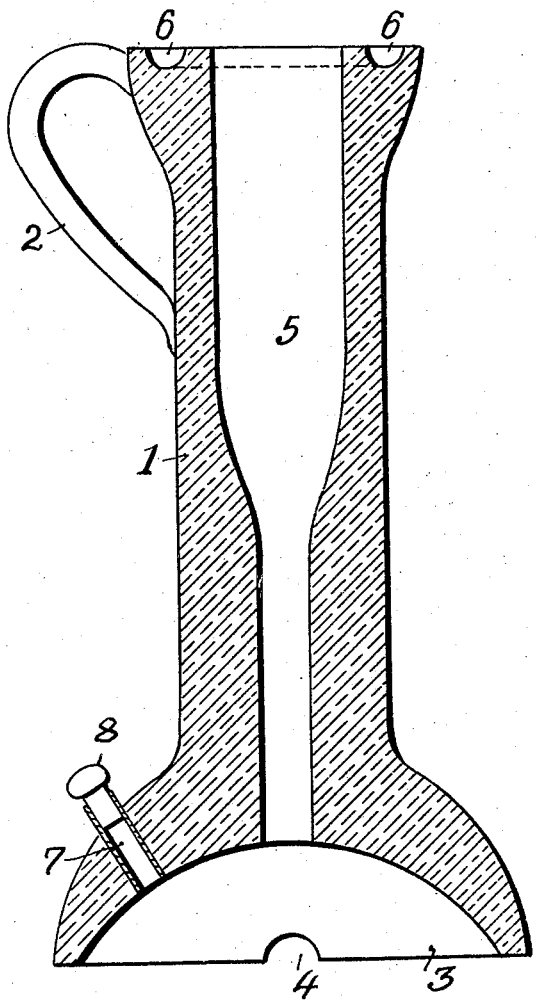
Inventor:

Patented Oct. 18, 1927.

1,646,017

UNITED STATES PATENT OFFICE.

ANDREAS ECKSTEIN, OF WALDSASSEN, GERMANY.

DEVICE FOR PREVENTING BOILING OVER OF MILK AND FOR INDICATING THE BOILING OF THE MILK.

Application filed April 1, 1927, Serial No. 180,315, and in Germany February 9, 1927.

This invention relates to a device designed to prevent the boiling over of milk in a pot and to indicate—in case the milk could not be permanently observed—that it has boiled in the meantime.

An embodiment of the invention is illustrated by way of example, in the only figure of the accompanying drawing which shows the device in vertical section.

The device is preferably made of porcelain, clay or other suitable material as aluminum.

The device 1 is of cylindrical shape and slightly enlarged at the top portion. It has a handle 2 and a large foot. In the lower surface of the foot a cavity 3 is arranged and the lower edge has indentations 4. From the cavity 3 extends a bore 5 in upward direction which is enlarged in the upper portion. In the top edge of the device 1 a groove 6 is arranged concentric to the bore 5 and preferably of a dark colour. In the foot of the device a valve 7 is arranged which has a stopper 8 in the outer end.

The device is placed in the milk pot and when the milk begins to boil it rises through the indentations 4, cavity 3 and bore 5 over the top edge of the device to flow over the groove 6 over the outer rim of the top edge of the device back into the milk pot. Boiling over is thus absolutely prevented.

It is generally known that the rising of the boiling milk takes place for a very limited time only and that after a certain time i. e. after a certain duration of the boiling the boiling milk stops rising and sinks back. The grove 6 serves to make this proceeding recognizable after it has happened and in the case that the boiling of the milk had not been permanently observed. When the boiling over or rising milk has once flown over the groove 6 and dropped over the outer edge of the device, it will descend in the hollow cylinder 5 as the rising process has stopped and the sinking begun. The portion of the milk which, at the boiling over has remained in the groove 6, cannot flow back and serves to indicate that the milk has boiled in the meantime so that no further boiling has to be expected. The boiling of milk for a very long time is prejudicial to the quality of the milk. It is advisable to give to the groove 6 a dark colour in order that the white milk-remainders be easily perceived.

Valve 7, adapted to be closed by a porcelain stopper 8, serves when it is open and in case only a small quantity of milk has to be boiled or the milk had begun to get sour and must not be submitted to the normal boiling heat. In this case the boiling milk will circulate through the open valve so that it is heated less intensively.

I claim:—

1. A device for preventing the boiling over of milk, comprising in combination with a milk pot, a hollow cylinder to be placed into said milk pot so that the milk will rise in the bore of the hollow cylinder and flowing over the top edge of said device back into the pot the central bore of said hollow cylinder being gradually enlarged towards the upper end to prevent damming up of the milk in said bore.

2. A device for preventing the boiling over of milk, comprising in combination with a milk pot, a hollow cylinder to be placed into said milk pot so that the milk will rise in the bore of the hollow cylinder and flowing over the top edge of said device back into the pot, said device having a circular groove in its upper surface concentric to the central bore and designed to retain some of the boiling-over milk to indicate that the boiling has taken place.

3. A device for preventing the boiling over of milk, comprising in combination with a milk pot, a hollow cylinder to be placed into said milk pot so that the milk will rise in the bore of the hollow cylinder and flowing over the top edge of said device back into the pot, said device having a circular groove in its upper surface concentric to the central bore and designed to retain some of the boiling-over milk to indicate that the boiling has taken place, said groove being dark coloured to make the milk particles clearly visible.

In testimony whereof I affix my signature.

ANDREAS ECKSTEIN.